US012735248B2

(12) United States Patent
Komatsu et al.

(10) Patent No.: US 12,735,248 B2
(45) Date of Patent: Sep. 15, 2026

(54) METHOD FOR CONSTRUCTING TRIPLE-SHELL TANK

(71) Applicant: KAWASAKI JUKOGYO KABUSHIKI KAISHA, Kobe (JP)

(72) Inventors: Takanori Komatsu, Kobe (JP); Masato Terabayashi, Kobe (JP); Makoto Nakayama, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 289 days.

(21) Appl. No.: 18/724,071

(22) PCT Filed: Dec. 21, 2022

(86) PCT No.: PCT/JP2022/047106

§ 371 (c)(1),
(2) Date: Jun. 25, 2024

(87) PCT Pub. No.: WO2023/127641

PCT Pub. Date: Jul. 6, 2023

(65) Prior Publication Data

US 2025/0058963 A1 Feb. 20, 2025

(30) Foreign Application Priority Data

Dec. 27, 2021 (JP) ................................ 2021-212502

(51) Int. Cl.
*B65D 88/08* (2006.01)
*E04H 7/06* (2006.01)
(Continued)

(52) U.S. Cl.
CPC ............. *B65D 88/08* (2013.01); *E04H 7/065* (2013.01); *B65D 7/22* (2013.01); *B65D 7/38* (2013.01);
(Continued)

(58) Field of Classification Search
CPC . B65D 7/22; B65D 7/38; B65D 88/08; B65D 2588/02; B65D 2590/02;
(Continued)

(56) References Cited

U.S. PATENT DOCUMENTS 3,935,633 A * 2/1976 Bunker .................... E04H 7/06 29/559
3,974,617 A * 8/1976 Tominaga ................ E04H 7/06 52/247
(Continued)

FOREIGN PATENT DOCUMENTS

GB 1112852 A 5/1968
JP S56-077474 A 6/1981
(Continued)

*Primary Examiner* — Jermie E Cozart
(74) *Attorney, Agent, or Firm* — Oliff PLC

(57) ABSTRACT

A method for constructing a triple shell tank including an inner tank, an intermediate tank, and an outer tank each having a roof and a side plate includes the following procedure. An intermediate tank roof is temporarily fixed onto an inner tank roof, and further an outer tank roof is temporarily fixed onto the intermediate tank roof to form a connected roof body. An outer tank side plate having a predetermined height is installed around the connected roof body. A sealing process is performed between an outer peripheral edge of the outer tank roof and an inner face of the outer tank side plate to form a sealed space, and air is supplied to the sealed space to air-raise the connected roof body. The outer tank roof and the outer tank side plate are fixed. An inner tank side plate and an intermediate tank side plate are installed and the temporary fixing of the connected
(Continued)

roof body is released to fix the inner tank roof and the inner tank side plate and fix the intermediate tank roof and the intermediate tank side plate.

6 Claims, 14 Drawing Sheets

(51) Int. Cl.
*B65D 6/10* (2006.01)
*B65D 6/32* (2006.01)

(52) U.S. Cl.
CPC ...... *B65D 2588/02* (2013.01); *B65D 2590/02* (2013.01); *B65D 2590/04* (2013.01); *E04H 7/06* (2013.01); *F17C 2201/0109* (2013.01); *F17C 2209/221* (2013.01); *F17C 2209/232* (2013.01); *F17C 2209/234* (2013.01)

(58) Field of Classification Search
CPC ....... B65D 2590/04; E04H 7/06; E04H 7/065; F17C 2201/0109; F17C 2209/221; F17C 2209/232; F17C 2209/234
See application file for complete search history.

(56) References Cited

U.S. PATENT DOCUMENTS

| | | | | |
|---|---|---|---|---|
| 2005/0011899 | A1 * | 1/2005 | Saitoh | B65D 90/24 220/565 |
| 2009/0134158 | A1 * | 5/2009 | Boyd | B29C 53/66 220/62.19 |
| 2010/0154319 | A1 * | 6/2010 | Shockley | E04H 7/18 52/745.01 |
| 2014/0097189 | A1 * | 4/2014 | Simmons | F17C 3/022 220/560.04 |
| 2015/0197953 | A1 | 7/2015 | Shiomi et al. | |
| 2016/0083957 | A1 * | 3/2016 | Yamada | E04H 7/06 52/745.01 |

FOREIGN PATENT DOCUMENTS

| | | | | | |
|---|---|---|---|---|---|
| JP | S64-058776 | A | | 3/1989 | |
| JP | H10-037513 | A | | 2/1998 | |
| JP | H11-182064 | A | | 7/1999 | |
| JP | 2015010361 | A | * | 1/2015 | E04H 7/065 |
| JP | 5672787 | B2 | | 2/2015 | |
| JP | 6127453 | B2 | | 5/2017 | |
| PH | 12015502239 | B1 | * | 2/2016 | E04H 7/065 |
| WO | WO-2012099042 | A1 | * | 7/2012 | E04H 7/065 |

* cited by examiner

METHOD FOR CONSTRUCTING TRIPLE-SHELL TANK

TECHNICAL FIELD

The present disclosure relates to a method for constructing a triple shell tank that stores a low temperature liquefied gas.

BACKGROUND ART

A flat-bottomed tank having a multi-shell structure is known as a facility for storing a low temperature liquefied gas. Construction of this type of multi-shell tank generally requires a long construction period because the construction structure itself is large in scale and impartment of a heat insulation structure is required. For example, Patent Literatures 1 and 2 disclose a method for constructing a tank having a double-shell structure including an inner tank and an outer tank for the purpose of shortening of the construction period. In recent years, a flat-bottomed tank having a triple shell structure including an intermediate tank between an inner tank and an outer tank has been studied as a storage facility for a cryogenic liquefied gas.

Since the triple shell tank naturally has a complicated structure as compared with the double-shell tank, the construction period of the triple shell tank tends to be longer.

CITATION LIST

Patent Literature

Patent Literature 1: Japanese Patent No. 6127453
Patent Literature 2: Japanese Patent No. 5672787

SUMMARY OF INVENTION

An object of the present disclosure is to provide a construction method that can shorten a construction period thereof in constructing a triple shell tank including an inner tank, an intermediate tank, and an outer tank.

A method for constructing a triple shell tank according to an aspect of the present disclosure is a method for constructing a triple shell tank including an inner tank, an intermediate tank, and an outer tank each having a roof and a side plate, the method including: temporarily fixing an intermediate tank roof onto an inner tank roof and further temporarily fixing an outer tank roof onto the intermediate tank roof to form a connected roof body; installing an outer tank side plate having a predetermined height around the connected roof body; performing a sealing process between an outer peripheral edge of the outer tank roof and an inner face of the outer tank side plate to form a sealed space, and supplying air to the sealed space to air-raise the connected roof body; fixing the outer tank roof and the outer tank side plate; and installing an inner tank side plate and an intermediate tank side plate and releasing the temporary fixing of the connected roof body to fix the inner tank roof and the inner tank side plate and fix the intermediate tank roof and the intermediate tank side plate.

According to the present disclosure, it is possible to provide a construction method that can shorten a construction period thereof in constructing a triple shell tank including an inner tank, an intermediate tank, and an outer tank.

DESCRIPTION OF EMBODIMENTS

Hereinafter, embodiments of the method for constructing the triple shell tank according to the present disclosure will be described in detail with reference to the drawings. The triple shell tank that is a construction target of the present disclosure is a tank that stores a low temperature liquefied gas, and is a flat-bottomed tank having a ground installation triple shell structure. The liquefied gas to be stored is, for example, liquefied hydrogen or liquid helium.

[Structure of Triple-Shell Tank]

Figure 1:
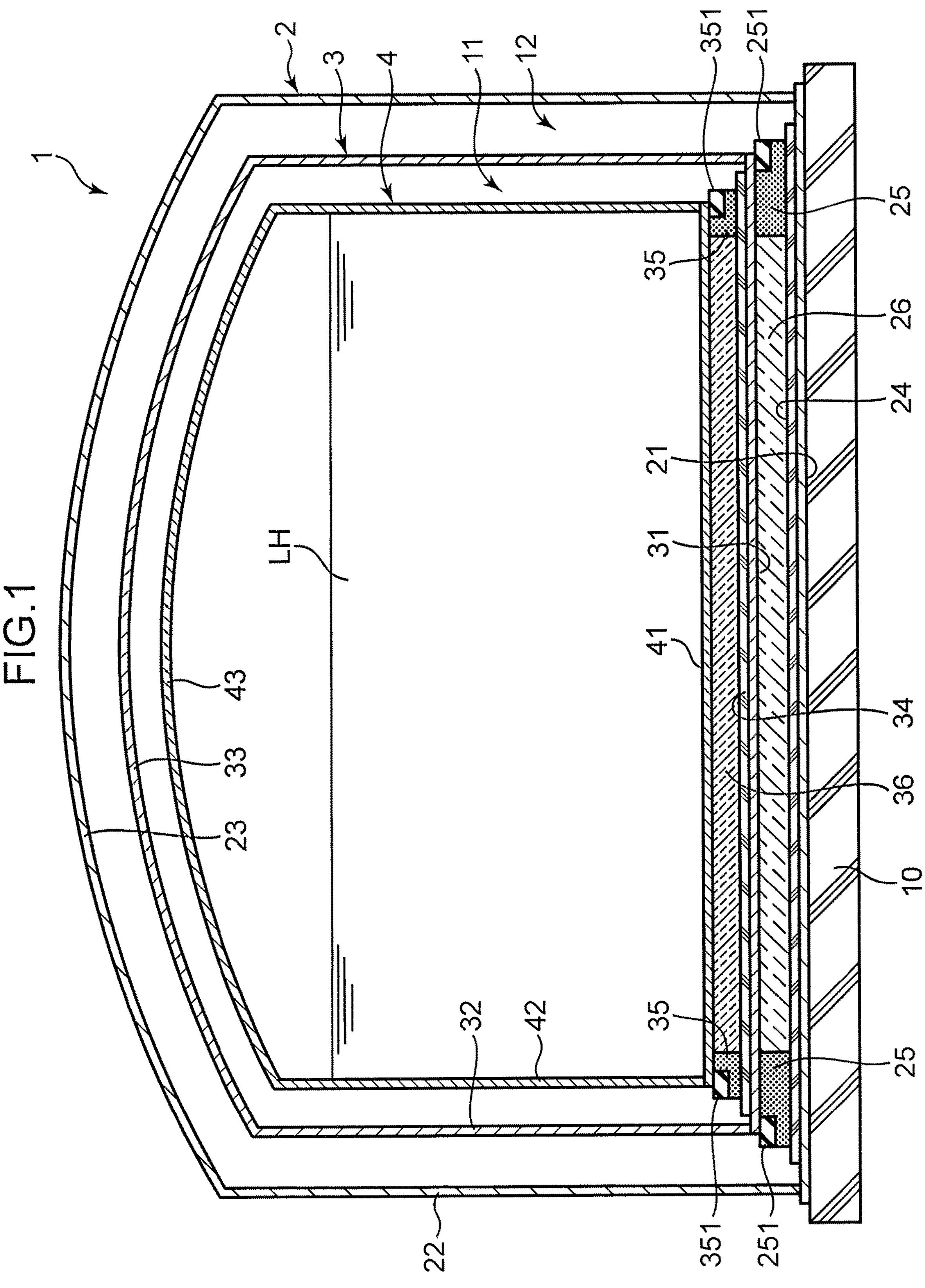
FIG. 1 is a longitudinal cross-sectional view illustrating a structure of a triple shell tank that becomes a construction target according to the present disclosure.

First, the structure of a triple shell tank 1 that becomes a construction target according to the present disclosure will be described with reference to the longitudinal cross-sectional view illustrated in FIG. 1. FIG. 1 illustrates a triple shell tank 1 that stores liquid hydrogen LH. The triple shell tank 1 includes a tank base 10, an outer tank 2 erected on the tank base 10, an intermediate tank 3 contained in the outer tank 2, and an inner tank 4 contained in the intermediate tank 3. The outer tank 2, the intermediate tank 3, and the inner tank 4 each have a circular shape in top view, and are disposed concentrically.

The tank base 10 is a concrete layer constituting a base portion of the triple shell tank 1. The tank base 10 has a size larger than an outer diameter of the outer tank 2. The outer tank 2 is a sealed body made of metal such as carbon steel, and includes an outer tank bottom plate 21, an outer tank side plate 22, and an outer tank roof 23. The outer tank bottom plate 21 is laid immediately above the tank base 10, and has a disk shape. The outer tank side plate 22 is erected from a peripheral edge of the outer tank bottom plate 21 and has a cylindrical shape. The outer tank roof 23 is attached to the upper end of the outer tank side plate 22 so as to close an upper surface opening of the outer tank side plate 22 having a cylindrical shape, and has a dome shape.

The intermediate tank 3 is a sealed body made of metal such as SUS, and is disposed inside the outer tank 2. The intermediate tank 3 includes an intermediate tank bottom plate 31, an intermediate tank side plate 32, and an intermediate tank roof 33. The intermediate tank bottom plate 31 has a disk shape having a diameter smaller than that of the outer tank bottom plate 21. The intermediate tank side plate 32 is erected from a peripheral edge of the intermediate tank bottom plate 31 and has a cylindrical shape. The intermediate tank roof 33 is attached to the upper end of the intermediate tank side plate 32 and has a dome shape.

A first level concrete layer 24, a first ring portion 25, and an outer bottom portion cool layer 26 are interposed between the outer tank bottom plate 21 and the intermediate tank bottom plate 31. The first level concrete layer 24 is a flattened concrete layer constructed on the outer tank bottom plate 21. The first ring portion 25 is a high-strength concrete layer arranged in a ring shape on the vicinity of the peripheral edge of the first level concrete layer 24. A reinforced concrete layer 251 is disposed at a part of the first ring portion 25 that directly receives a load of the intermediate tank side plate 32. The outer bottom portion cool layer 26 is a layer having a heat insulating property disposed on the first level concrete layer 24 and inside the first ring portion 25. The first ring portion 25 can be formed of an array body of insulating concrete blocks such as perlite concrete blocks. The outer bottom portion cool layer 26 can be formed of an array body of insulating inorganic block materials such as foam glass. For example, a plate material of lightweight aerated concrete may be laid on the outer bottom portion cool layer 26.

The inner tank 4 is a tank that actually stores liquid, is a sealed body made of metal such as SUS, and is disposed inside the intermediate tank 3. The inner tank 4 includes an inner tank bottom plate 41, an inner tank side plate 42, and an inner tank roof 43. The inner tank bottom plate 41 has a disk shape having a diameter smaller than that of the intermediate tank bottom plate 31. The inner tank side plate 42 is erected from a peripheral edge of the inner tank bottom plate 41 and has a cylindrical shape. The inner tank roof 43 is attached to the upper end of the inner tank side plate 42 and has a dome shape. The liquid hydrogen LH is stored inside the inner tank 4.

A second level concrete layer 34, a second ring portion 35, and an inner bottom portion cool layer 36 are interposed between the intermediate tank bottom plate 31 and the inner tank bottom plate 41. The second level concrete layer 34 is constructed on the intermediate tank bottom plate 31. The second ring portion 35 is a high-strength concrete layer arranged in a ring shape on the vicinity of the peripheral edge of the second level concrete layer 34. A reinforced concrete layer 351 is disposed at a part of the second ring portion 35 that directly receives a load of the inner tank side plate 42. The inner bottom portion cool layer 36 is a layer having a heat insulating property disposed on the second level concrete layer 34 and inside the second ring portion 35. For example, the second ring portion 35 can be formed of a perlite concrete block, and the inner bottom portion cool layer 36 can be formed of a foam glass block or the like. For example, a plate material of lightweight aerated concrete may be laid on the inner bottom portion cool layer 36.

A gap having a predetermined width is provided between the inner tank 4 and the intermediate tank 3 and between the intermediate tank 3 and the outer tank 2. A first inter-vessel 11, which is a gap between the inner tank 4 and the intermediate tank 3, and a second inter-vessel 12, which is a gap between the intermediate tank 3 and the outer tank 2, are filled with a heat insulation material. As the heat insulation material, perlite or glass wool can be used. The first inter-vessel 11 is filled with a low-boiling gas equivalent to the liquid hydrogen LH stored in the inner tank 4, for example, hydrogen gas. The second inter-vessel 12 is filled with nitrogen gas, for example.

[Method for Constructing Triple-Shell Tank]

Figure 2:
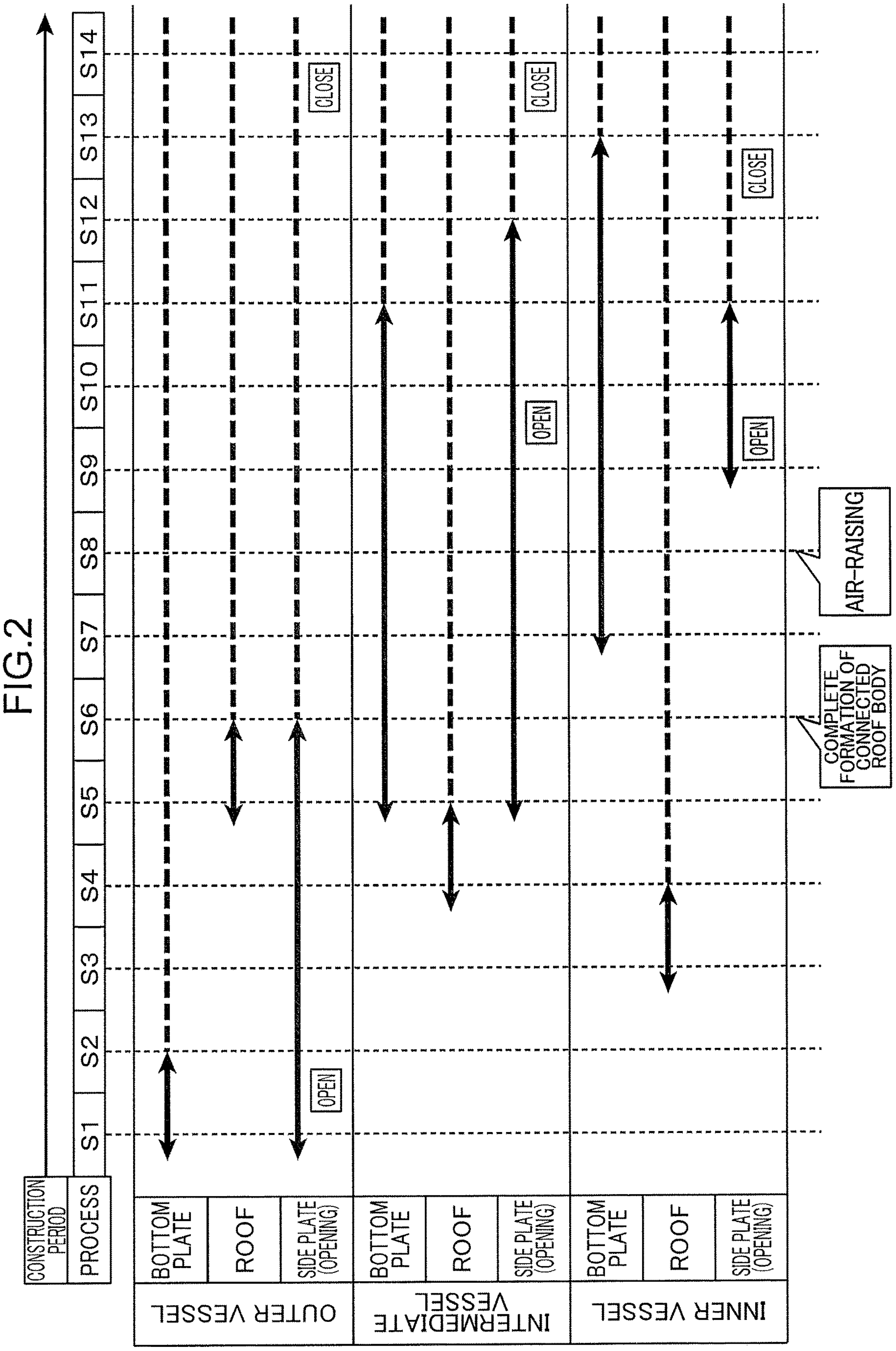
FIG. 2 is a process chart of a method for constructing a triple shell tank according to the present disclosure.

Next, the method for constructing the triple shell tank 1 illustrated in FIG. 1 will be described. FIG. 2 is a process chart showing one embodiment of the method for constructing the triple shell tank 1 according to the present disclosure. FIG. 2 shows the relationship between processes S1 to S14 performed during the construction period of the triple shell tank 1 and the construction time of each part of the triple shell tank 1. Specifically, for each of the bottom plates 21, 31, and 41, the roofs 23, 33, and 43, and the side plates 22, 32, and 42 of the outer tank 2, the intermediate tank 3, and the inner tank 4, the construction period during which the main construction work is actually performed is indicated by the solid arrows, and the period after the construction is indicated by the dotted lines, each of which is shown in FIG. 2. Regarding the side plates 22, 32, and 42, opening timing of a construction opening, which is a construction entrance, is indicated as "open", and sealing timing of the construction opening is indicated as "close". Note that processes S1 to S14 are not necessarily divided in units of processes serving as a division of a tank construction procedure, and the progress status of construction may be simply divided as "process".

As also shown in FIG. 2, a characteristic point of the construction method of the present embodiment lies in forming, by ground work, a connected roof body formed by temporarily fixing the intermediate tank roof 33 and the inner tank roof 43 to the outer tank roof 23 is formed by ground work (process S6), and floating (process S8) the connected roof body by air-raising. FIGS. 3 to 16 are views schematically illustrating construction states of the triple shell tank 1 in processes S1 to S14 shown in FIG. 2, respectively. FIGS. 3 to 16 illustrate, with a cross section, a part corresponding to half from a radial center RC of the triple shell tank 1. Hereinafter, each of processes S1 to S14 will be described with reference to FIGS. 3 to 16.

<Process S1>

Figure 3:
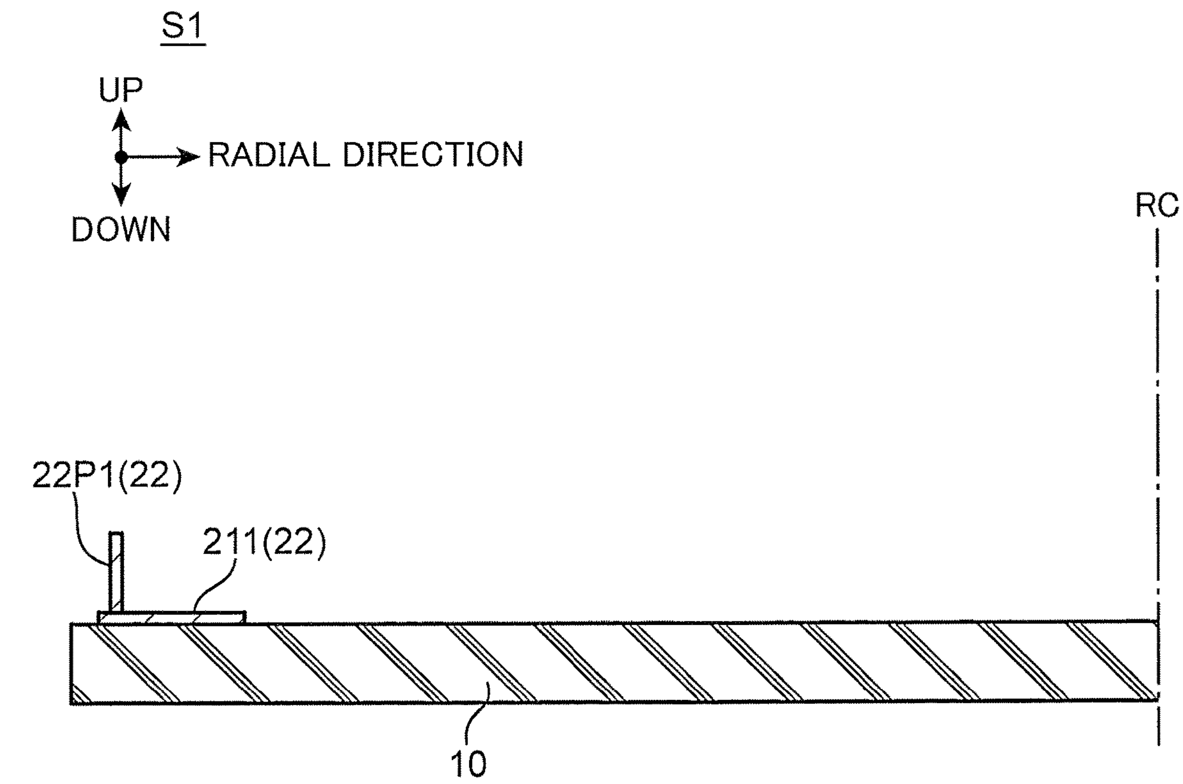
FIG. 3 is a view illustrating, with a cross section of half of the tank, one process of the method for constructing the triple shell tank.

FIG. 3 illustrates a construction status in process S1. In process S1, a part of the outer tank 2 is installed on the tank base 10. Specifically, an outer tank annular 211 constituting a part of the outer tank bottom plate 21 and an outer tank side plate piece 22P1 constituting a part of the outer tank side plate 22 are installed in the vicinity of a peripheral edge part of the tank base 10. The outer tank annular 211 constitutes a circular part in the vicinity of the outer periphery of the outer tank bottom plate 21 having a disk shape, and becomes a portion positioned below the first ring portion 25. The outer tank annular 211 has a plate thickness thicker than other part of the outer tank bottom plate 21 in order to improve load bearing property.

The outer tank side plate 22 is assembled by using a plurality of side plate pieces formed of a rectangular plate gently curved in an arc shape. Specifically, the side plate pieces are arranged in a circular ring shape, and adjacent side plate pieces are welded to form one circular step. By stacking a plurality of such circular steps, the outer tank side plate 22 is installed. The outer tank side plate piece 22P1 illustrated in FIG. 3 is a side plate piece constituting the lowermost circular step of the outer tank side plate 22. The outer tank side plate piece 22P1 is erected vertically upward from a slightly inner side of a radially outer peripheral edge of the outer tank annular 211.

<Process S2>

Figure 4:
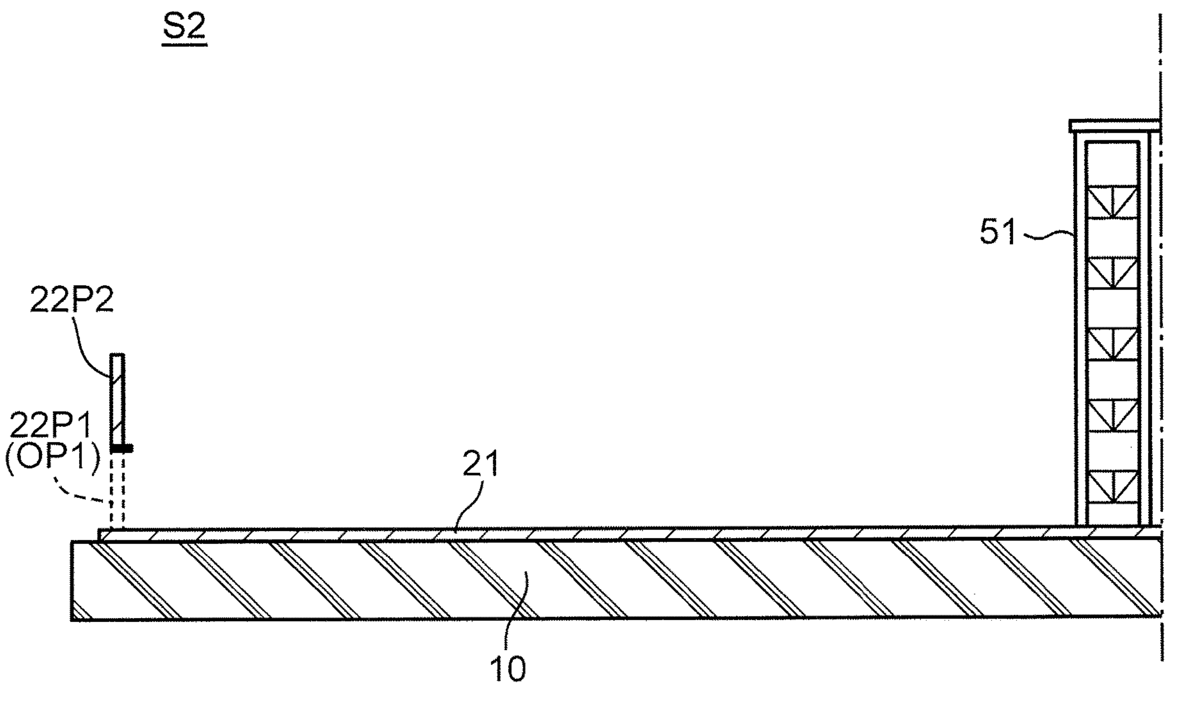
FIG. 4 is a view illustrating one process of the method for constructing the triple shell tank.

FIG. 4 illustrates a construction status in process S2. In process S2, construction of the outer tank bottom plate 21 and the outer tank side plate 22 is performed. Regarding the outer tank bottom plate 21, a radially inner part of the outer tank annular 211 is laid. This inner part is a part positioned immediately below the outer bottom portion cool layer 26. Although not illustrated in FIG. 4, the first level concrete layer 24 illustrated in FIG. 1 is placed on the outer tank bottom plate 21 after being laid. First, a part of the first level concrete layer 24 is placed on the outer tank annular 211. Thereafter, after the inner tank roof 43 and the intermediate tank roof 33 are installed to eliminate the risk of rainwater infiltration, the remaining part of the first level concrete layer 24 is placed on the inner part of the outer tank annular 211.

Regarding the outer tank side plate 22, an outer tank side plate piece 22P2 constituting a second circular step is installed on the outer tank side plate piece 22P1 constituting the lowermost circular step. Note that after installation of the second circular step, the lowermost circular step is provided with a first opening OP1, which becomes a construction opening. The first opening OP1 is opened by pulling out one or a plurality of the plurality of outer tank side plate pieces 22P1 constituting the lowermost circular step. Specifically, after the plurality of outer tank side plate pieces 22P1 are arranged in a circular shape to once form a circular step, only the outer tank side plate piece 22P1 corresponding to the position of the first opening OP1 is not welded to the adjacent piece, and is removed from the circular step.

A center roof support 51 is placed in the vicinity of the radial center RC of the outer tank bottom plate 21. The center roof support 51 is a frame for enabling the dome type inner tank roof 43 to be installed on the ground side before air-raising.

<Process S3>

Figure 5:
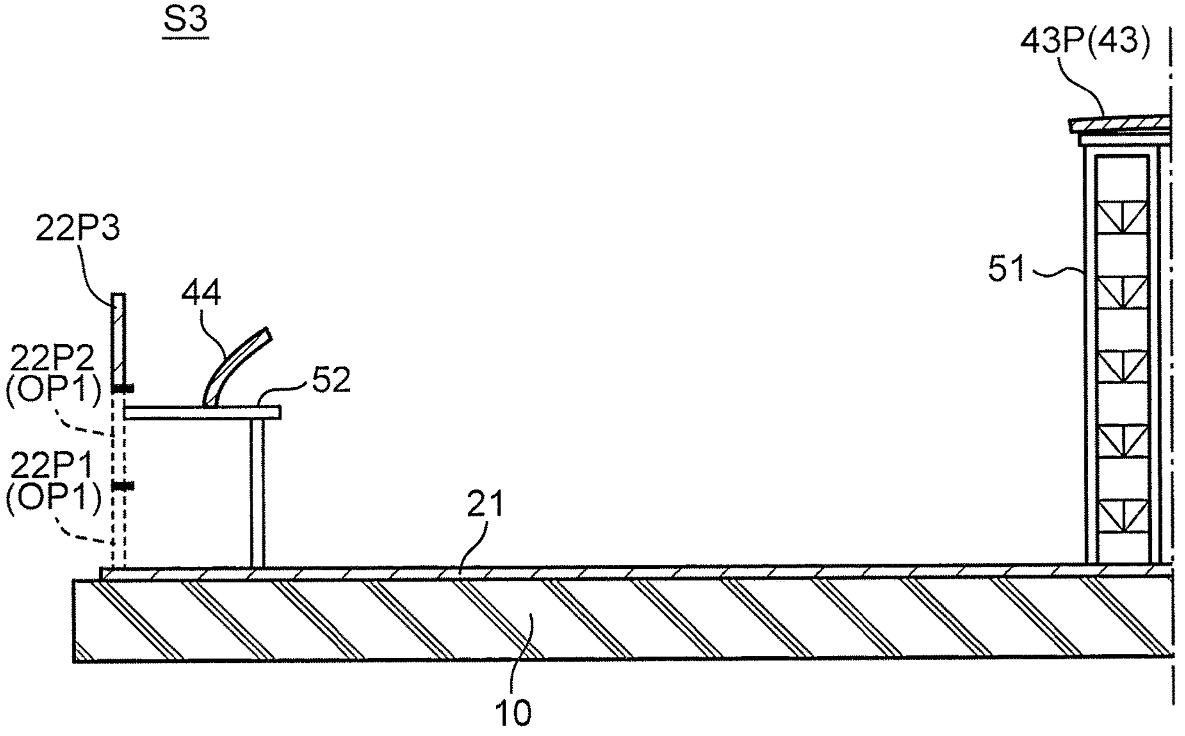
FIG. 5 is a view illustrating one process of the method for constructing the triple shell tank.

FIG. 5 illustrates a construction status in process S3. In process S3, the construction of the outer tank side plate 22 is continued, and installation of the inner tank roof 43 is started. Regarding the outer tank side plate 22, an outer tank side plate piece 22P3 constituting a third circular step is installed on the outer tank side plate piece 22P2 constituting the second circular step. Similarly to the above, after installation of the third circular step, one or a plurality of the outer tank side plate pieces 22P2 in the second circular step are pulled out, thereby opening the first opening OP1, which becomes a construction opening. The outer tank side plate piece 22P2 to be pulled out is a piece positioned immediately above the outer tank side plate piece 22P1 pulled out for opening the first opening OP1 in the lowermost circular step. The reason for opening the first opening OP1 at a height corresponding to two circular steps in the outer tank side plate 22 is to match the opening height to the construction opening to be opened in the intermediate tank side plate 32 and the inner tank side plate 42 where the installation is started from a position higher than the outer tank side plate 22.

Regarding the inner tank roof 43, an inner tank roof piece 43P constituting the vicinity of the radial center of the inner tank roof 43 is installed on the center roof support 51 placed in the previous process S2. On the other hand, an outer periphery roof support 52 is placed on the upper surface in the vicinity of the radially outer periphery of the outer tank bottom plate 21. The outer periphery roof support 52 is a frame temporarily supporting the outer peripheral lower edge of the inner tank roof 43 and the intermediate tank roof 33. An inner tank knuckle plate 44 is installed on the upper surface of the outer periphery roof support 52. The inner tank knuckle plate 44 is a plate connecting the upper end of the inner tank side plate 42 and the outer peripheral lower edge of the inner tank roof 43.

<Process S4>

Figure 6:
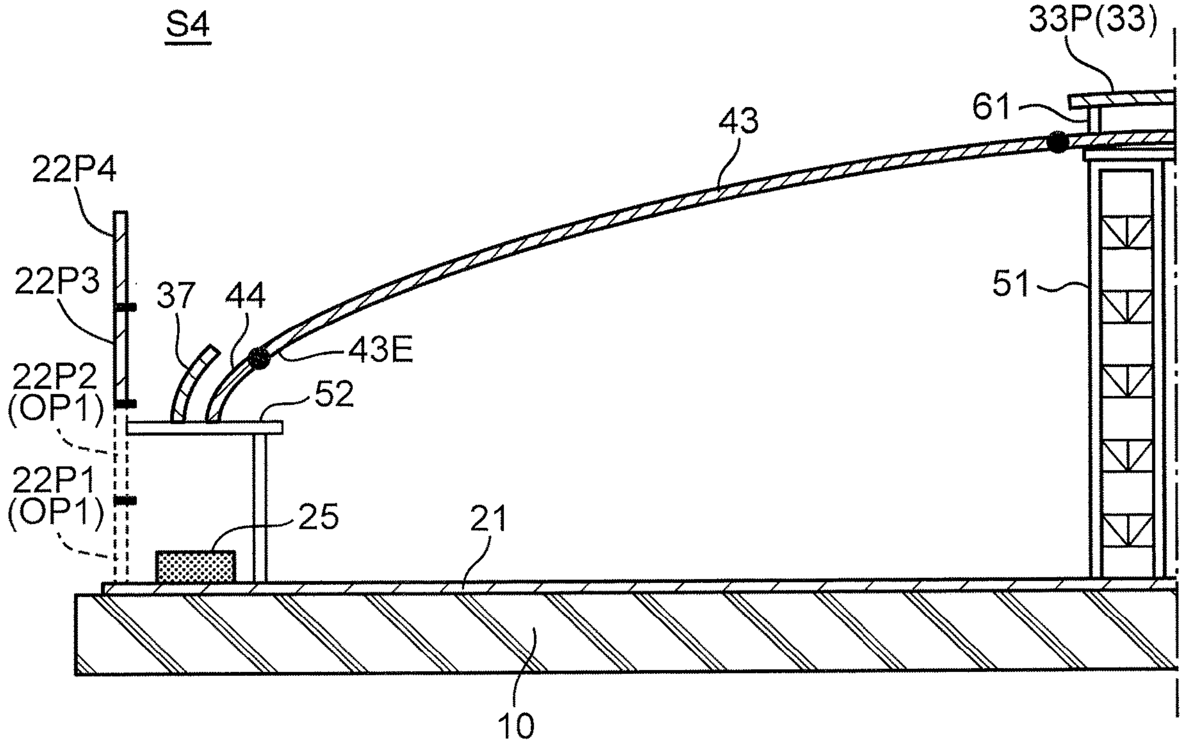
FIG. 6 is a view illustrating one process of the method for constructing the triple shell tank.

FIG. 6 illustrates a construction status in process S4. In process S4, the installation of the inner tank roof 43 is continued, and installation of the intermediate tank roof 33 is started. Regarding the inner tank roof 43, the inner tank roof 43 having a dome shape is finally formed by connecting between the inner tank roof piece 43P at the radial center placed in process S3 and the inner tank knuckle plate 44 by an inner tank roof block assembled in advance by ground work. The inner tank roof block includes a roof skeleton serving as a support frame and a plurality of roof plates attached to this roof skeleton. An outer peripheral edge 43E of the inner tank roof 43 is fixed to the upper end of the inner tank knuckle plate 44. At this time point, the inner tank roof 43 is supported by the outer periphery roof support 52 and brought into a self-standing state, and therefore the center roof support 51 is removed.

Regarding the intermediate tank roof 33, an intermediate tank roof piece 33P constituting the vicinity of the radial center of the intermediate tank roof 33 is installed on a radial center portion of the inner tank roof 43 completed in process S3. In this installation, the intermediate tank roof support 61 (first temporary support) is used. The intermediate tank roof support 61 is interposed between the inner tank roof 43 and the intermediate tank roof 33, and temporarily fixes the both at a predetermined interval. As the intermediate tank roof support 61, a member having rigidity such as H steel can be used. The temporary fixing can be performed in an aspect in which, for example, the lower end part of the H steel is welded and fixed to the inner tank roof 43 via a predetermined backing plate, and the intermediate tank roof piece 33P is placed and fixed on the upper end part of the H steel.

Installation of the outer tank side plate 22 is also continued in a timely manner. FIG. 6 illustrates a state in which an outer tank side plate piece 22P4 constituting the fourth circular step is installed. An intermediate tank knuckle plate 37 is installed on the upper surface of the outer periphery roof support 52. The intermediate tank knuckle plate 37 is a plate connecting the upper end of the intermediate tank side plate 32 and the outer peripheral lower edge of the intermediate tank roof 33. Furthermore, blocks constituting the first ring portion 25 are laid on the upper surface in the vicinity of the radially outer periphery of the outer tank bottom plate 21.

<Process S5>

Figure 7:
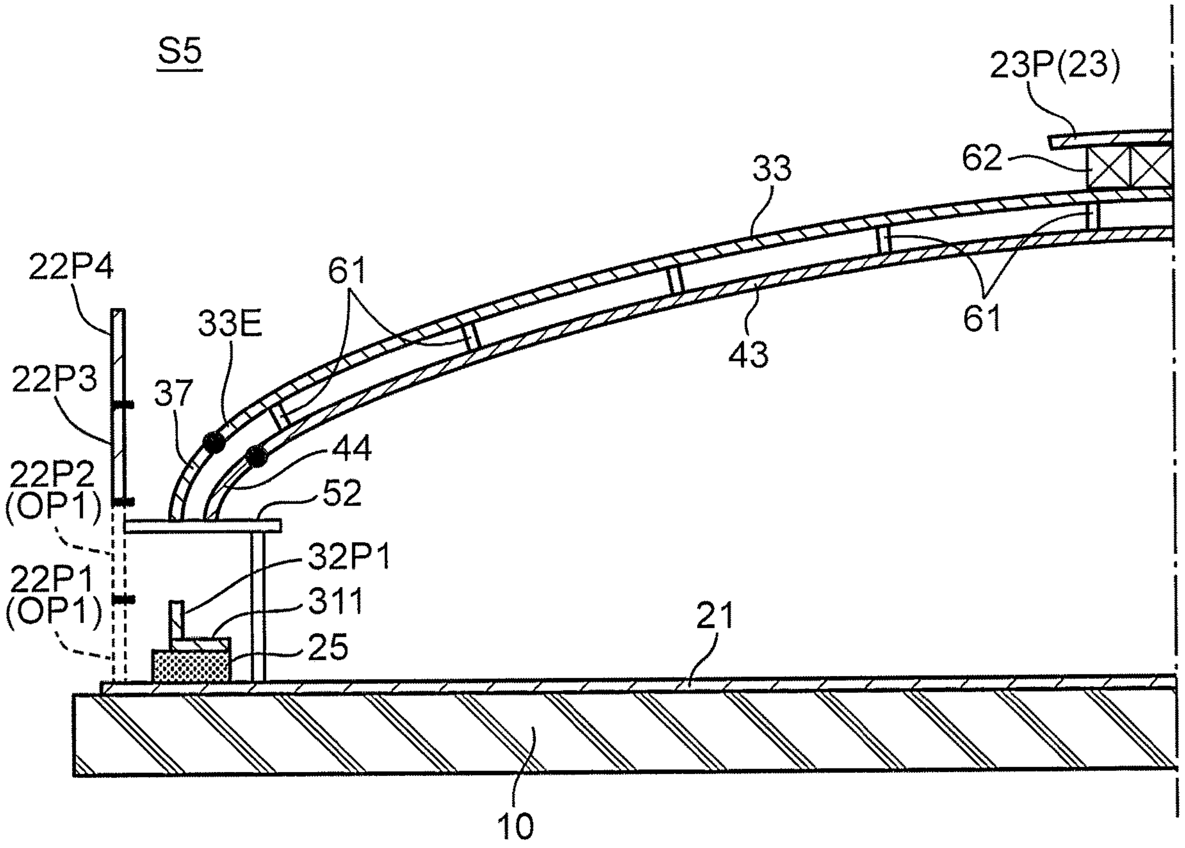
FIG. 7 is a view illustrating one process of the method for constructing the triple shell tank.

FIG. 7 illustrates a construction status in process S5. In process S5, the installation of the intermediate tank roof 33 is continued, and installation of the outer tank roof 23 is started. Installation of the intermediate tank bottom plate 31 and the intermediate tank side plate 32 is started. Regarding the intermediate tank roof 33, the intermediate tank roof 33 having a dome shape is finally formed by connecting between the intermediate tank roof piece 33P at the radial center placed in process S4 and the intermediate tank knuckle plate 37 by an intermediate tank roof block assembled in advance by ground work. Similarly to the inner tank roof block described above, the intermediate tank roof block includes a roof skeleton and a plurality of roof plates. During the placement of this intermediate tank roof block, the intermediate tank roof support 61 is disposed at an appropriate location between the intermediate tank roof 33 and the inner tank roof 43, and the both are temporarily fixed. An outer peripheral edge 33E of the intermediate tank roof 33 is fixed to the upper end of the intermediate tank knuckle plate 37.

Regarding the outer tank roof 23, an outer tank roof piece 23P constituting the vicinity of the radial center of the outer tank roof 23 is installed on a radial center portion of the intermediate tank roof 33 completed in process S4. In this installation, an outer tank roof center support 62 (second temporary support) is used. The outer tank roof center support 62 is interposed between the intermediate tank roof 33 and the outer tank roof piece 23P at the radial center, and temporarily fixes the both at a predetermined interval. As the outer tank roof center support 62, a frame or the like in which H steel or a steel material is assembled in a truss structure can be used. The temporary fixing can be performed in an aspect in which the lower end part of the H steel or the like is welded and fixed to the intermediate tank roof 33 via a predetermined backing plate, and the outer tank roof piece 23P is placed and fixed on the upper end part of the H steel or the like.

An intermediate tank annular 311 constituting a part of the intermediate tank bottom plate 31 and an intermediate tank side plate piece 32P1 (side plate piece) constituting a part of the intermediate tank side plate 32 are installed on the first ring portion 25 placed in the previous process S4. The intermediate tank annular 311 is a circular part in the vicinity of the outer periphery of the intermediate tank bottom plate 31 having a disk shape, and has a plate thickness thicker than the other part of the intermediate tank bottom plate 31. The intermediate tank side plate 32 is also assembled by stacking a plurality of circular steps formed by arranging a plurality of side plate pieces in a circular ring shape. The intermediate tank side plate piece 32P1 illustrated in FIG. 7 is a side plate piece constituting the lowermost circular step of the intermediate tank side plate 32. The intermediate tank side plate piece 32P1 is erected vertically upward from a radially outer peripheral edge of the intermediate tank annular 311. The intermediate tank side plate piece 32P1 is also a side plate piece that matches the height of the second circular step of the intermediate tank side plate 32 with the height of the lowermost circular step of the inner tank side plate 42 to be installed later.

<Process S6>

Figure 8:
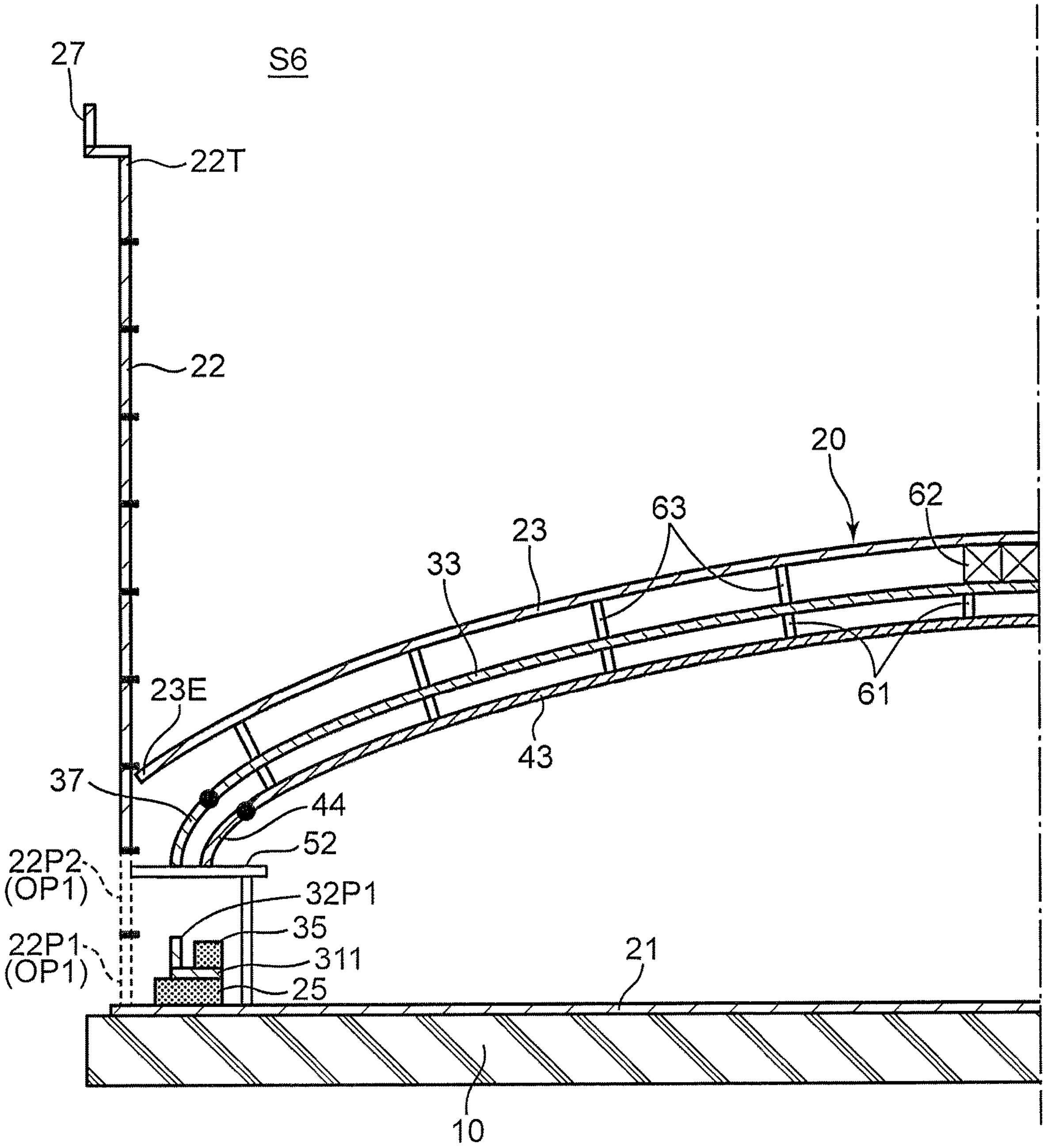
FIG. 8 is a view illustrating one process of the method for constructing the triple shell tank.

FIG. 8 illustrates a construction status in process S6. In process S6, installation of the outer tank roof 23 is continued, and finally a connected roof body 20 in which the three roofs are integrated is formed. Installation up to a predetermined height of the outer tank side plate 22 is performed. Regarding the outer tank roof 23, the outer tank roof 23 having a dome shape is finally formed by connecting the outer tank roof block assembled in advance by ground work to the outer tank roof piece 23P at the radial center placed in process S5. During this extension, an outer tank roof periphery support 63 (second temporary support) made of H steel or the like is disposed at an appropriate location between the intermediate tank roof 33 and the outer tank roof 23, and the both are temporarily fixed.

At the time point when the installation of the outer tank roof 23 is completed, the formation of the connected roof body 20 is brought into a completed state. That is, the connected roof body 20 is formed by temporarily fixing the intermediate tank roof 33 on the inner tank roof 43 by the intermediate tank roof support 61, and temporarily fixing the outer tank roof 23 on the intermediate tank roof 33 by the outer tank roof center support 62 and the outer tank roof periphery support 63. Formation of such a connected roof body 20 enables these three roofs to be integrally air-raised. The supports 61, 62, and 63 described above serve as support members of the upper roof until completion of air-raising, but serve as suspension members of the lower roof after air-raising.

Note that in the formation state of the connected roof body 20, a gap between the inner tank roof 43 and the intermediate tank roof 33 and a gap between the intermediate tank roof 33 and the outer tank roof 23 are set slightly narrower than the gap between them in the triple shell tank 1 after completion. This is to facilitate the fixing work of the inner tank roof 43 to the inner tank side plate 42 and the fixing work of the intermediate tank roof 33 to the intermediate tank side plate 32, which are executed after air-raising.

Regarding the outer tank side plate 22, installation is completed by stacking a predetermined number of circular steps formed by the side plate pieces. Due to this, the outer tank side plate 22 having a predetermined height is installed around the connected roof body 20, and preparation for air-raising is brought into an enabled state. An outer periphery corridor 27 is installed on a top part 22T of the outer tank side plate 22. On the intermediate tank annular 311, a part of the second level concrete layer 34, which is not illustrated here, is placed, and a block constituting the second ring portion 35 is laid.

<Process S7>

Figure 9:
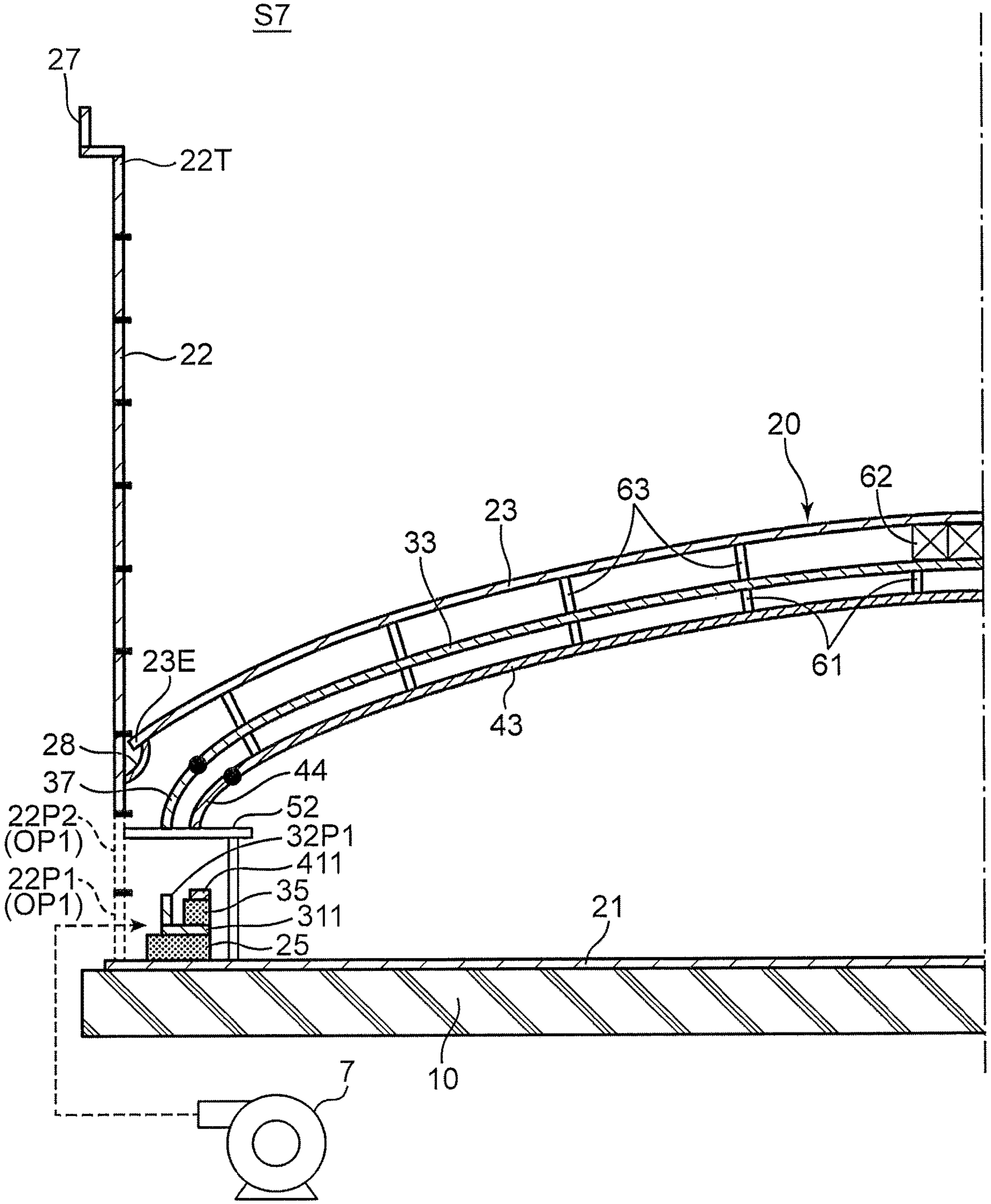
FIG. 9 is a view illustrating one process of the method for constructing the triple shell tank.

FIG. 9 illustrates a construction status in process S7. In process S7, preparation work for air-raising is mainly performed. In order to form a sealed space, an outer peripheral edge 23E of the outer tank roof 23 is subjected to a sealing process of attaching a sealing material 28. The sealing material 28 seals a gap between the outer peripheral edge 23E and the inner face of the outer tank side plate 22. On the outer side of the outer tank side plate 22, a blower 7 that supplies air for air-raising is prepared. A blowing duct is connected to an air delivery port of the blower 7, and this blowing duct is drawn into the inner side of the outer tank side plate 22 through the first opening OP1. Note that the first opening OP1 is also subjected to a sealing process for sealing around the blowing duct. Since the outer tank bottom plate 21 has already been completed before process S7, a sealing process of the bottom surface portion is not particularly necessary. Accordingly, at this time point, the space surrounded by the outer tank bottom plate 21, the outer tank side plate 22, and the outer tank roof 23 is sealed.

In parallel with the above air-raising preparation work, an inner tank annular 411 is installed on the upper surface of the second ring portion 35. The inner tank annular 411 is a circular part in the vicinity of the outer periphery of the inner tank bottom plate 41 having a disk shape.

<Process S8>

Figure 10:
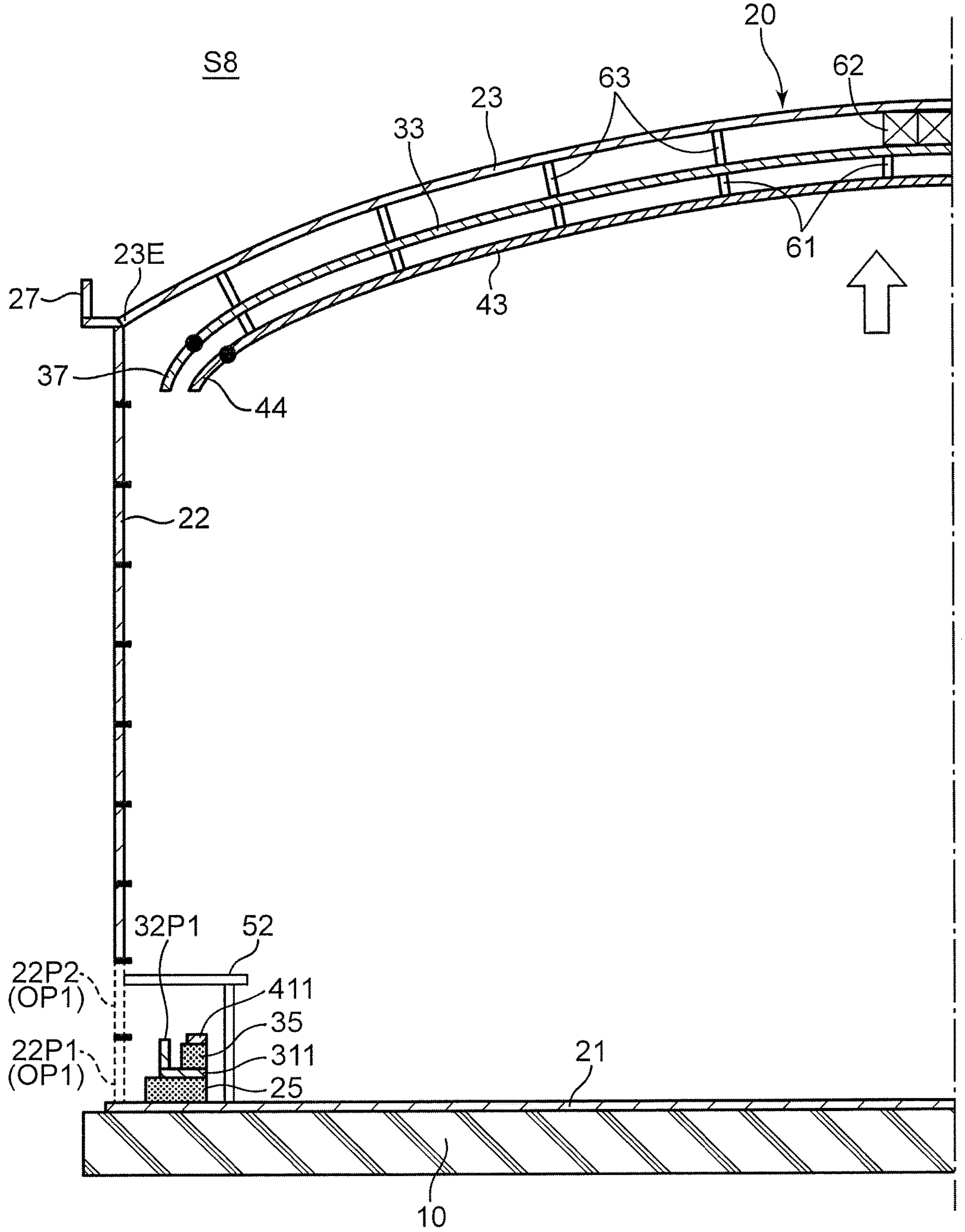
FIG. 10 is a view illustrating one process of the method for constructing the triple shell tank.

FIG. 10 illustrates a state after performing of air-raising in process S8. In executing air-raising, the blower 7 illustrated in FIG. 9 is operated, and air is supplied to the sealed space surrounded by the outer tank bottom plate 21, the outer tank side plate 22, and the outer tank roof 23. Air pressure in the sealed space is increased by air supply, and the connected roof body 20 is floated by the pressure. At this time, the outer tank side plate 22 plays a role as a guide of the floating connected roof body 20.

It is the outer tank roof 23 that directly floats by air-raising. However, the inner tank roof 43 and the intermediate tank roof 33 are integrated with the outer tank roof 23 in advance by the temporary supports 61, 62, and 63. Accordingly, the inner tank roof 43 and the intermediate tank roof 33 are also integrally floated in an aspect of being suspended from the outer tank roof 23. That is, since the connected roof body 20 is formed in advance, the three roofs 23, 33, and 43 forming the triple shell structure can be floated at once by one time of air-raising. Note that at the time of air-raising, the floating attitude of the connected roof body 20 is controlled using a balance wire.

After the air-raising, the outer peripheral edge 23E of the outer tank roof 23 is fixed to the upper end of the outer tank side plate 22. At this time point, the temporary fixing of the connected roof body 20 is not released, and the inner tank roof 43 and the intermediate tank roof 33 remain in a state of being suspended from the outer tank roof 23. Equipment for air-raising is removed. That is, the sealing material 28 attached to the vicinity of the outer peripheral edge 23E of the outer tank roof 23 is detached, and the blower 7 and the air blowing duct are removed.

<Process S9>

Figure 11:
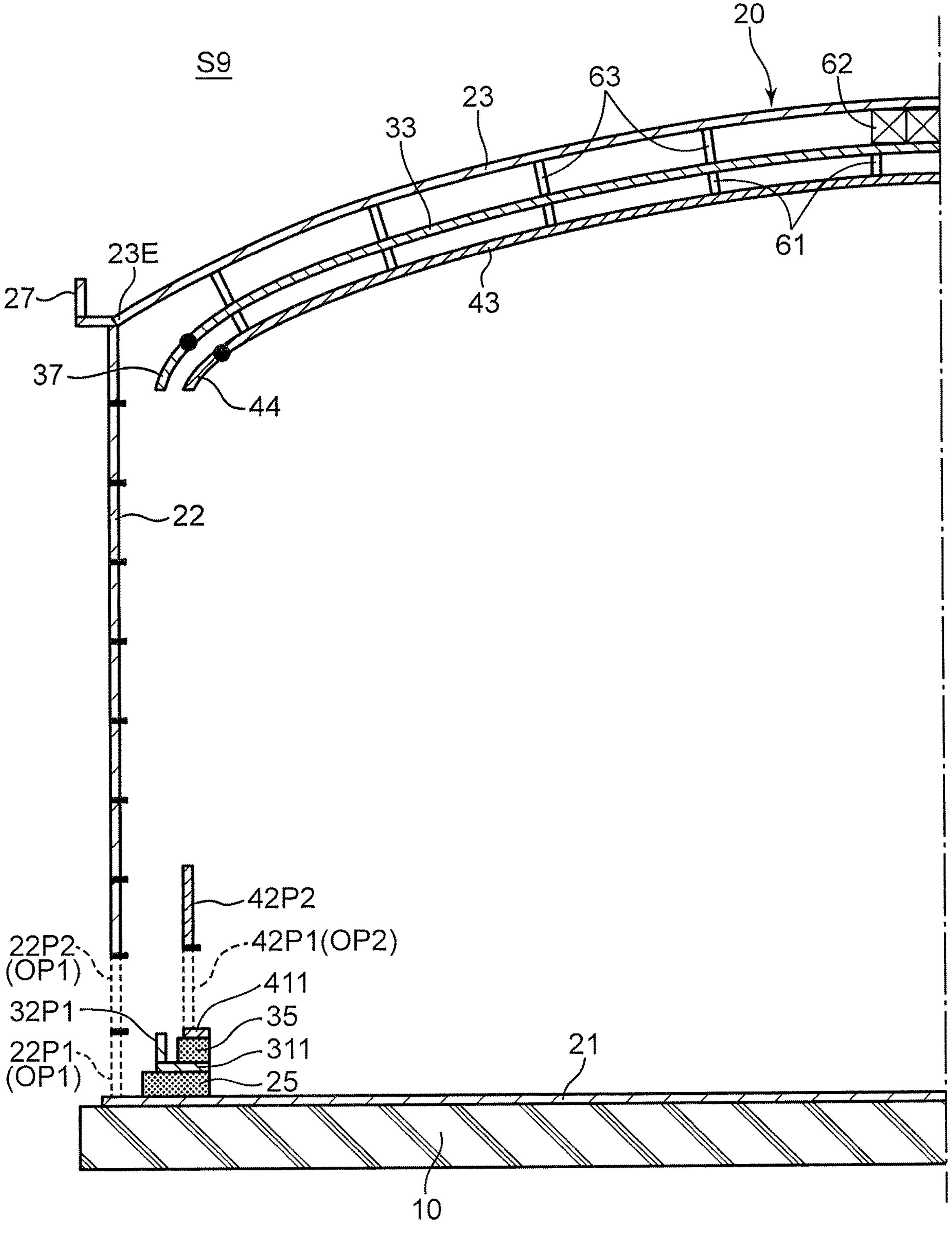
FIG. 11 is a view illustrating one process of the method for constructing the triple shell tank.

FIG. 11 illustrates a construction status in process S9. In process S9, installation of the inner tank side plate 42 is started. The inner tank side plate 42 is also assembled by stacking a plurality of circular steps formed by arranging a plurality of side plate pieces in a circular ring shape. An inner tank side plate piece 42P1 (side plate piece) constituting the lowermost circular step of the inner tank side plate 42 is installed on the inner tank annular 411. The inner tank side plate piece 42P1 is erected vertically upward from a radially outer peripheral edge of the inner tank annular 411. FIG. 11 illustrates a state in which an inner tank side plate piece 42P2 constituting a second circular step is installed on the lowermost inner tank side plate piece 42P1.

When the inner tank side plate 42 is installed, a second opening OP2 is provided as a construction opening. The second opening OP2 is opened by pulling out one or a plurality of the plurality of inner tank side plate pieces 42P1 constituting the lowermost circular step. The opening position of the second opening OP2 is a position corresponding to the first opening OP1 opened in the outer tank side plate 22. Specifically, the second opening OP2 and the first opening OP1 are opened at substantially the same position in the circumferential direction of the triple shell tank 1, and are opened so as to have substantially an identical height position. In the present embodiment, the inner tank side plate piece 42P1 and the second outer tank side plate piece 22P2 are positioned at substantially the same height position. In the outer tank side plate 22, not only the lowermost outer tank side plate piece 22P1 but also the second outer tank side plate piece 22P2 are removed, whereby the height positions of the second opening OP2 and the first opening OP1 are matched.

<Process S10>

Figure 12:
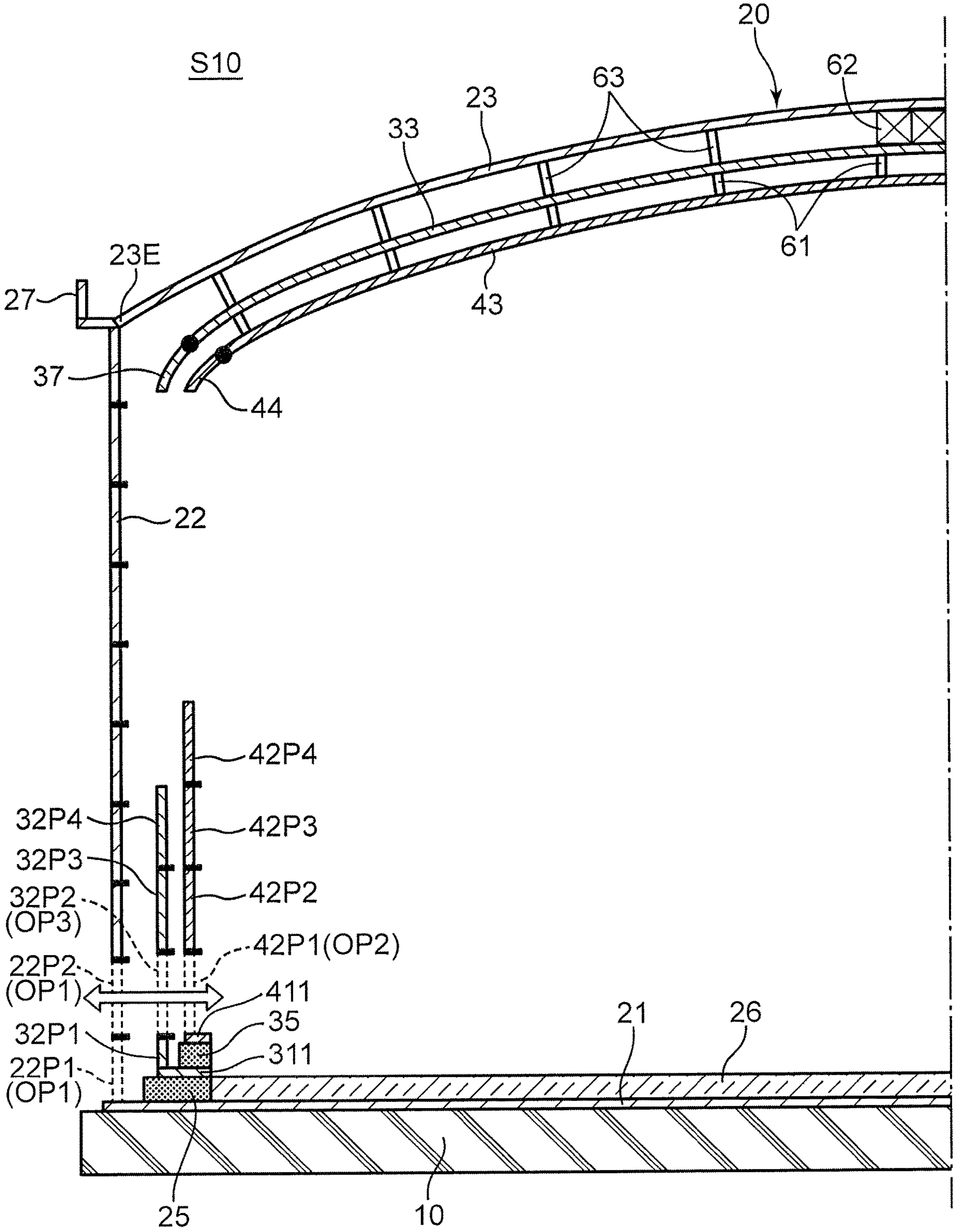
FIG. 12 is a view illustrating one process of the method for constructing the triple shell tank.

FIG. 12 illustrates a construction status in process S10. In process S10, the inner tank side plate 42 and the intermediate tank side plate 32 are installed. Regarding the inner tank side plate 42, an inner tank side plate piece 42P3 constituting the third circular step is installed on the inner tank side plate piece 42P2 constituting the second circular step. Furthermore, the side plate height is sequentially raised in such a manner that a fourth inner tank side plate piece 42P4 is installed thereon.

Similarly, also regarding the intermediate tank side plate 32, the intermediate tank side plate pieces 32P2, 32P3, and 32P4 constituting the second, third, and fourth circular steps are sequentially stacked on the installed lowermost intermediate tank side plate piece 32P1. In the present embodiment, an inner tank side plate piece 42Pn and an intermediate tank side plate piece 32Pn (excluding the piece 32P1 for height matching) have the same height width. Accordingly, the inner tank side plate pieces 42P1, 42P2, and 43P3 and the intermediate tank side plate pieces 32P2, 32P3, and 32P4 illustrated in FIG. 12 are positioned at the same height position, respectively.

In process S10, the circular step of any one of the inner tank side plate 42 and the intermediate tank side plate 32 may be stacked first and then the circular step of the other may be stacked, but it is desirable to stack the circular steps of the inner tank side plate 42 and the intermediate tank side plate 32 simultaneously in parallel. For example, after the second inner tank side plate piece 42P2 of the inner tank side plate 42 is stacked, the third intermediate tank side plate piece 32P3 of the intermediate tank side plate 32 is stacked, and subsequently the third inner tank side plate piece 42P3 of the inner tank side plate 42 is stacked. Adoption of such an installation method can achieve improvement of work efficiency such as sharing a scaffold in installation of the inner tank side plate 42 and the intermediate tank side plate 32. For convenience of crane lifting work and assembling work of the side plate pieces, it is desirable that stacking of the inner tank side plate pieces 42Pn positioned on the radially inner side precede stacking of the intermediate tank side plate pieces 32Pn.

A third opening OP3 is provided as a construction opening also when the intermediate tank side plate 32 is installed. The third opening OP3 is opened by pulling out one or a plurality of the intermediate tank side plate pieces 32P2 constituting the second circular step. As indicated by "open" in the chart of FIG. 2, at the time point of process S10, the second opening OP2 is opened in the inner tank side plate 42, and the third opening OP3 is opened in the intermediate tank side plate 32.

The opening position of the third opening OP3 is a position corresponding to the second opening OP2 of the inner tank side plate 42. Specifically, the second opening OP2 and the third opening OP3 are opened at substantially the same position in the circumferential direction, and are opened so as to have substantially an identical height position. As described above, the second opening OP2 is opened at a position corresponding to the first opening OP1 of the outer tank side plate 22. Accordingly, the first opening OP1, the second opening OP2, and the third opening OP3 are opened at substantially identical circumferential position and height position. Therefore, it is possible to efficiently cause a worker to pass through inside and outside the tank under construction, and to materials and construction equipment to be carried in and out.

In process S10, the first level concrete layer 24 (not illustrated in FIG. 12) and the outer bottom portion cool layer 26 are sequentially laid further on the outer tank bottom plate 21. Since the part on the outer tank annular 211 of the first level concrete layer 24 has been constructed in process S2, the remaining part is constructed. As described above, the outer bottom portion cool layer 26 is installed by paving a heat insulating blocking material such as, for example, foam glass on the inside of the first ring portion 25.

<Process S11>

Figure 13:
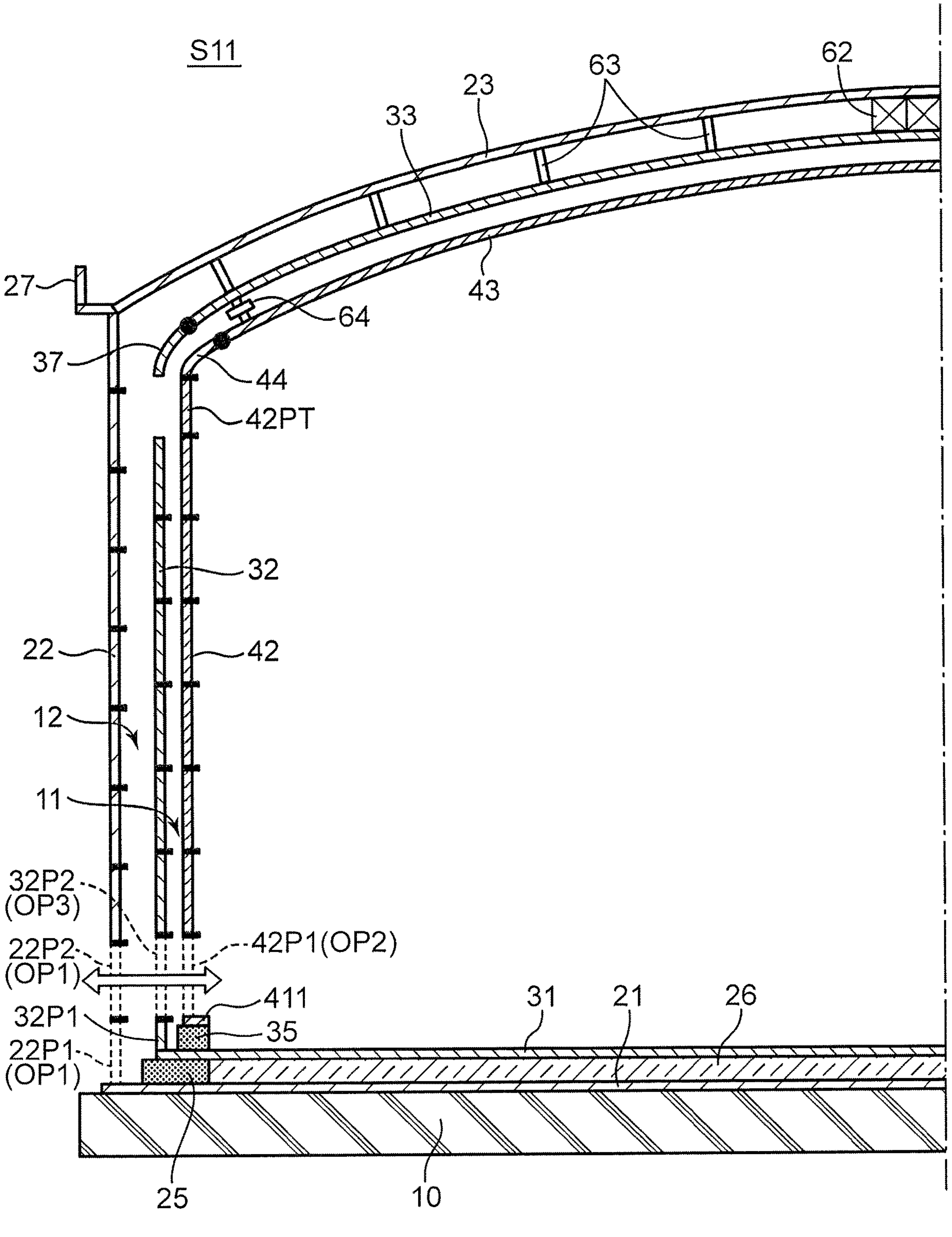
FIG. 13 is a view illustrating one process of the method for constructing the triple shell tank.

FIG. 13 illustrates a construction status in process S11. In process S11, installation continuation of the inner tank side plate 42 and the intermediate tank side plate 32, fixing of the inner tank side plate 42 and the inner tank roof 43, and laying of the intermediate tank bottom plate 31 are performed. Regarding the inner tank side plate 42 and the intermediate tank side plate 32, installation in the middle step to the upper step of the respective circular steps is performed. FIG. 13 illustrates a state in which in the inner tank side plate 42, an inner tank side plate piece 42PT constituting the uppermost circular step is assembled prior to the intermediate tank side plate 32 by one step.

The reason why the circular step of the inner tank side plate 42 is assembled up to the uppermost step prior to the intermediate tank side plate 32 is as follows. At the time of lifting the side plate pieces 32P and 42P, "outer lifting" in which the crane is disposed on the radially outer side of the side plate to perform the lifting is performed. This is in consideration that both the inner tank side plate 42 and the intermediate tank side plate 32 have an assembly jig including a scaffold on the inner face side, and the worker has access to the inner face side. If the intermediate tank side plate 32 is assembled first, presence of an inner face scaffold of the intermediate tank side plate 32 makes it difficult to lift the inner tank side plate piece 42P. Therefore, it is desirable to assemble the inner tank side plate 42 first, form the scaffold on the inner side of the intermediate tank side plate 32, and then lift up the intermediate tank side plate piece 32P from the outer side.

After the installation of the uppermost inner tank side plate piece 42PT, work of fixing the outer peripheral edge of the inner tank roof 43 to the upper end of the inner tank side plate 42 is performed. Prior to this fixing work, a replacement work of replacing the intermediate tank roof support 61 connecting the intermediate tank roof 33 and the inner tank roof 43 with a first jack 64 is performed. In a state where the outer tank roof 23 is fixed to the outer tank side plate 22 without releasing the temporary fixing of the connected roof body 20 after air-raising, the inner tank roof 43 is suspended from the intermediate tank roof 33 with the intermediate tank roof support 61 at a position higher than a normal height position. This is for securing an adjustment space when the inner tank roof 43 is connected to the inner tank side plate 42.

The first jack 64 is disposed at an appropriate location between the intermediate tank roof 33 and the inner tank roof 43, and suspends and supports the inner tank roof 43 movably up and down after the replacement. The lower end of the inner tank knuckle plate 44 and the upper end of the uppermost inner tank side plate piece 42PT are aligned while the inner tank roof 43 is jacked down with the first jack 64 by the amount of the lowering adjustment space. After the alignment, the both are fixed, and the inner tank 4 is substantially completed.

Furthermore, in process S11, the remaining part of the intermediate tank bottom plate 31 is laid on the outer bottom portion cool layer 26. Regarding the intermediate tank bottom plate 31, since the intermediate tank annular 311 constituting the outer periphery portion has been installed, the intermediate tank bottom plate 31 of the inner part is laid.

<Process S12>

Figure 14:
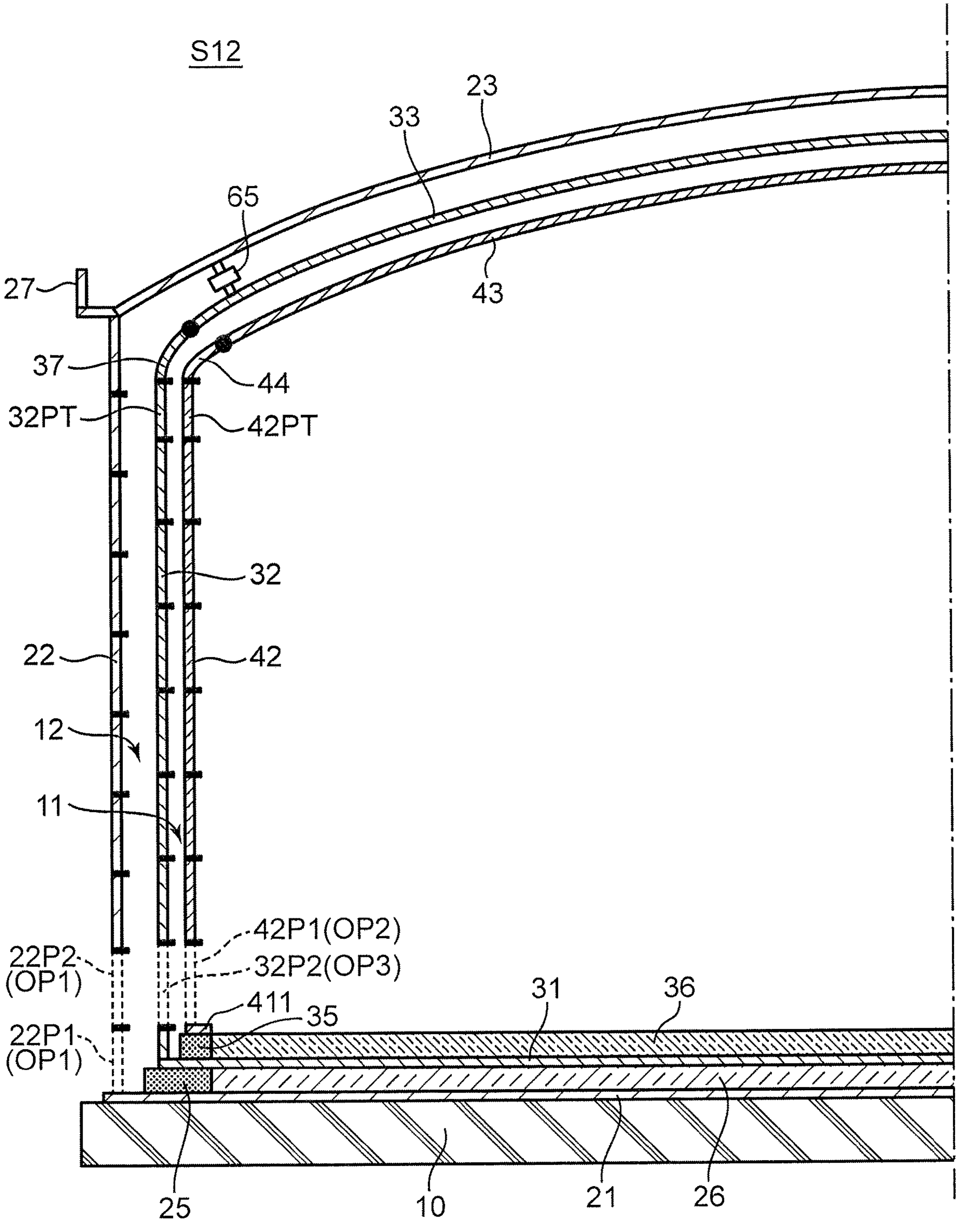
FIG. 14 is a view illustrating one process of the method for constructing the triple shell tank.

FIG. 14 illustrates a construction status in process S12. In process S12, fixing of the intermediate tank side plate 32 and the intermediate tank roof 33, and laying of the inner bottom portion cool layer 36 are performed. Similarly to the inner tank roof 43, a jack down system is also adopted for the fixing of the intermediate tank roof 33. After the inner tank roof 43 is fixed to the inner tank side plate 42, an intermediate tank side plate piece 32PT constituting the uppermost circular step of the intermediate tank side plate 32 is installed. On the other hand, a replacement work of replacing the outer tank roof center support 62 and the outer tank roof periphery support 63 connecting the outer tank roof 23 and the intermediate tank roof 33 with a second jack 65 is performed. The intermediate tank roof 33 is also suspended from the outer tank roof 23 at a position higher than the normal height position by the adjustment space.

The second jack 65 is disposed at an appropriate location between the outer tank roof 23 and the intermediate tank roof 33, and suspends and supports the intermediate tank roof 33 movably up and down after the replacement. The lower end of the intermediate tank knuckle plate 37 and the upper end of the uppermost intermediate tank roof piece 33PT are aligned while the intermediate tank roof 33 is jacked down with the second jack 65 by the amount of the adjustment space. After the alignment, the both are fixed, and the intermediate tank 3 is substantially completed.

In process S12, the inner bottom portion cool layer 36 is laid further on the intermediate tank bottom plate 31 (second level concrete layer 34). The inner bottom portion cool layer 36 is installed by paving a heat insulating blocking material such as, for example, foam glass on the inside of the second ring portion 35.

<Process S13>

Figure 15:
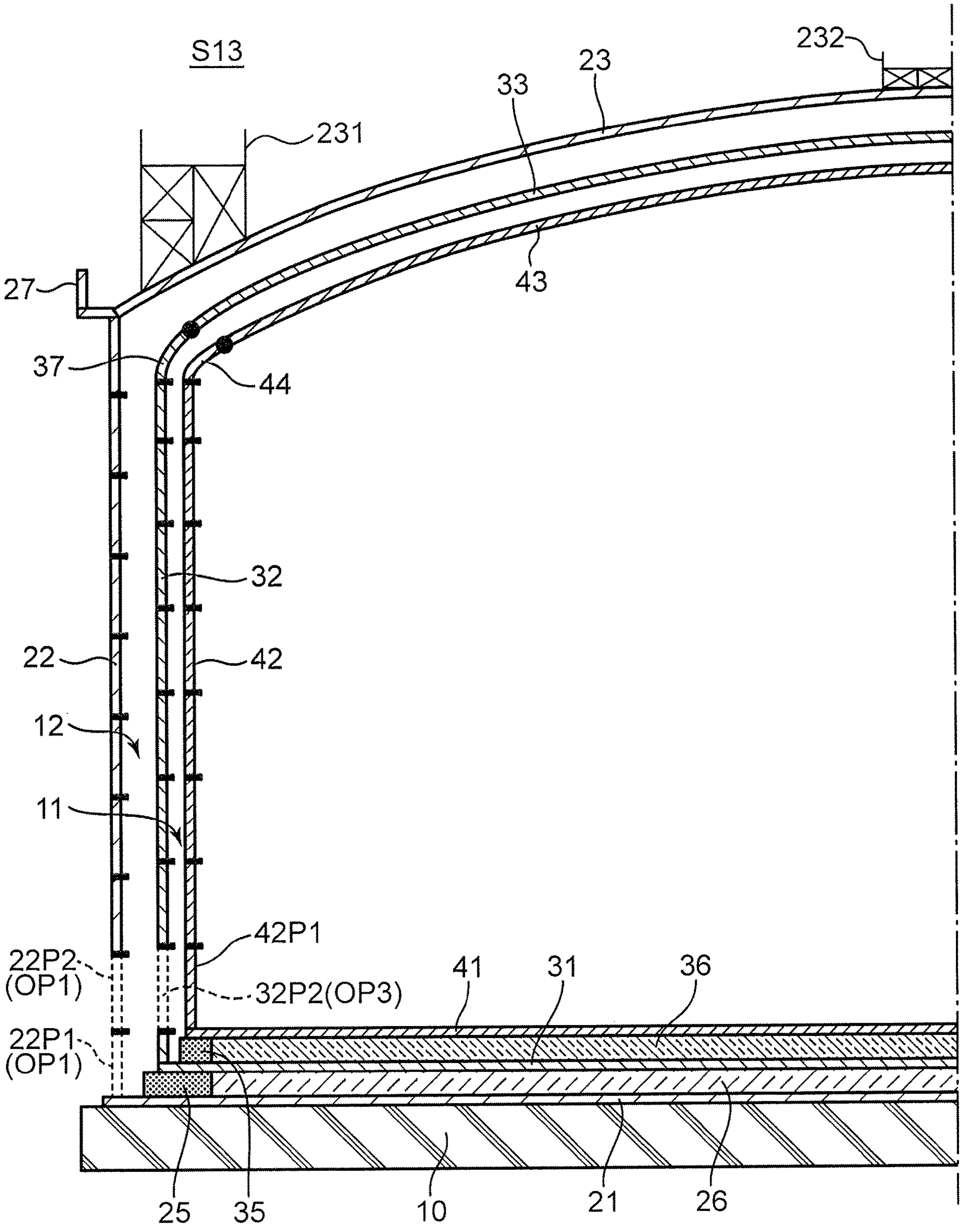
FIG. 15 is a view illustrating one process of the method for constructing the triple shell tank.

FIG. 15 illustrates a construction status in process S13. In process S13, laying of the inner tank bottom plate 41, sealing of the second opening OP2 is sealed, installation of a deck, and the like are performed. The inner tank bottom plate 41 is laid on the inner bottom portion cool layer 36. Regarding the inner tank bottom plate 41, since the inner tank annular 411 constituting the outer periphery portion has been installed, the inner tank bottom plate 41 of the inner part is laid.

After the work inside the inner tank 4 is completed and the scaffold or the like placed inside the inner tank 4 is removed, the second opening OP2 of the inner tank side plate 42 is sealed. This sealing work is work of fitting the inner tank side plate piece 42P1 pulled out from the lowermost circular step in process S9 into the second opening OP2 and welding the inner tank side plate piece 42P1 to a surrounding side plate piece. FIG. 15 illustrates a state in which the second opening OP2 is sealed.

A shoulder part deck 231 and a top part deck 232 are installed on the outer tank roof 23. The shoulder part deck 231 is disposed on a radially outer periphery part of the outer tank roof 23. The top part deck 232 is disposed at the radial center of the outer tank roof 23. Note that the work of filling the first inter-vessel 11 and the second inter-vessel 12 with a heat insulation material, the work of attaching various pipes and accessories, and the like are also performed.

<Process S14>

Figure 16:
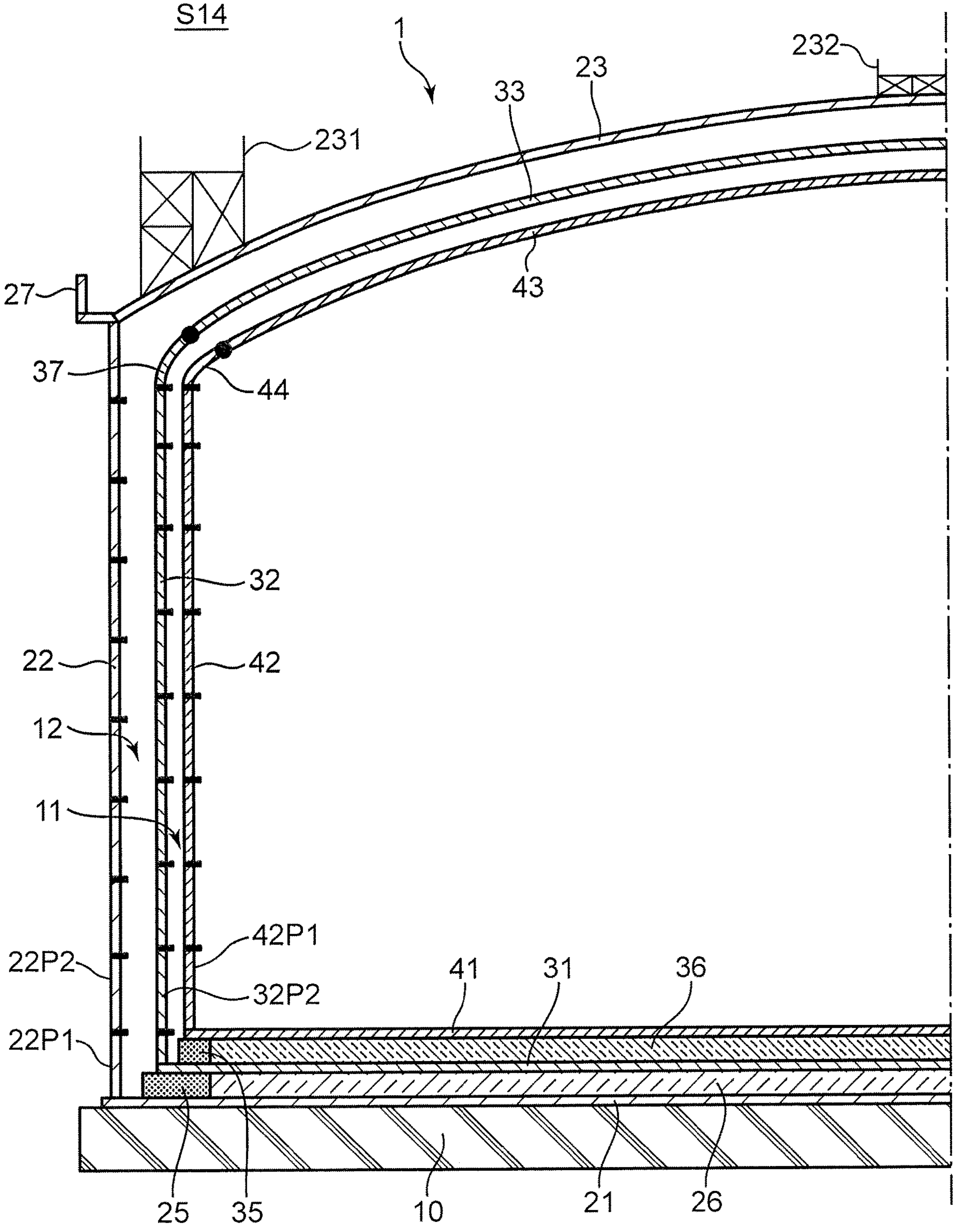
FIG. 16 is a view illustrating one process of the method for constructing the triple shell tank.

FIG. 16 illustrates a construction status in process S14. In process S14, the third opening OP3 and the first opening OP1 are sealed. The third opening OP3 of the intermediate tank side plate 32 is sealed after the work inside the intermediate tank 3 is completed and the scaffold or the like placed inside the intermediate tank 3 is removed. In this sealing work, the intermediate tank side plate piece 32P2 pulled out in process S10 is fitted into the third opening OP3, and the intermediate tank side plate piece 32P2 is welded to a surrounding side plate piece.

Subsequently, after the work inside the outer tank 2 is completed and the scaffold or the like placed inside the outer tank 2 is removed, the first opening OP1 of the outer tank side plate 22 is sealed. In this sealing work, the outer tank side plate pieces 22P1 and 22P2 pulled out in processes S2 and S3 are fitted so as to close the first opening OP1, and are welded. As described above, the construction openings are sequentially sealed upon completing the work in each side plate in the order of the inner second opening OP2, the intermediate third opening OP3, and the outer first opening OP1.

[Actions and Effects]

According to the method for constructing a triple shell tank according to the present disclosure described above, the connected roof body 20 in which the inner tank roof 43, the intermediate tank roof 33, and the outer tank roof 23 are temporarily fixed to one another is formed before air-raising. Specifically, the connected roof body 20 is prepared by temporarily fixing the intermediate tank roof 33 on the inner tank roof 43 by the intermediate tank roof support 61, and further temporarily fixing the outer tank roof 23 on the intermediate tank roof 33 by the outer tank roof center support 62 and the outer tank roof periphery support 63. After the outer tank side plate 22 serving as a guide of floating is formed around the connected roof body 20, the connected roof body 20 is air-raised.

Here, what is directly air-raised is the outer tank roof 23, the inner tank roof 43 and the intermediate tank roof 33 are also integrally floated in an aspect of being held by the outer tank roof 23. In other words, the inner tank roof 43 and the intermediate tank roof 33 also float in a state of being suspended from the outer tank roof 23. That is, each roof of the triple shell is prepared by ground base work, temporarily fixed, and integrated, and floated at once by one time of air-raising. Accordingly, most of the installation work of each roof of the triple shell can be executed by a low-place work in parallel with the installation work of the side plate and the like, which contributes to shortening of the construction period. After the outer tank roof 23 is fixed to the outer tank side plate 22 to form the outer tank 2, the inner tank side plate 42 and the intermediate tank side plate 32 can be installed. That is, installation work of the inner tank side plate 42 and the intermediate tank side plate 32 can be performed in the space covered with the outer tank 2. Accordingly, there is also an advantage that the installation work can be performed without being affected by the weather, and deterioration of welding quality due to interposition of moisture can be avoided.

Modified Embodiments

Although the embodiments of the method for constructing a triple shell tank according to the present disclosure have been described above, the present disclosure is not limited to the above embodiments at all. For example, the method for constructing the triple shell tank described above can assume the following modified embodiments.

(1) A necessary construction structure and equipment may be provided in the vicinity of the triple shell tank 1 described above. For example, a dike that suppresses diffusion when liquid in the tank leaks at the time of disaster or the like may be erected around the triple shell tank 1. The dike can be installed with prestressed concrete (PC), for example. The dike may be integrally constructed with the outer tank 2 made of metal. Specifically, an aspect in which the PC constituting the dike is installed in a state of being in close contact with the outer peripheral surface of the outer tank side plate 22 may be adopted. In this case, it is possible to increase the strength of the outer tank side plate 22 serving as a guide during air-raising of the connected roof body 20.

(2) Various structures for reinforcing the strength of the triple shell tank 1 may be added. For example, an anchor strap for connecting the intermediate tank side plate 32 and/or the inner tank side plate 42 and the tank base 10 may be included.

(3) A communication pipe for causing the internal space of the inner tank 4 and the space the first inter-vessel 11 to communicate with each other may be attached to the inner tank roof 43. According to this modification, the hydrogen gas vaporized from the liquid hydrogen LH stored in the inner tank 4 can be circulated the first inter-vessel 11. That is, the cooling effect can be enhanced by using the stored liquid hydrogen LH.

(4) In the embodiment described above, an example has been described in which the first opening OP1, the second opening OP2, and the third opening OP3 are opened at substantially the same height at the same position in the circumferential direction of the triple shell tank 1. These openings OP1, OP2, and OP3 may be opened at different positions in the circumferential direction of the triple shell tank 1, or may be opened at different heights.

Summary of Present Disclosure

The specific embodiments described above include a disclosure having the following configurations.

A method for constructing a triple shell tank according to the present disclosure is a method for constructing a triple shell tank including an inner tank, an intermediate tank, and an outer tank each having a roof and a side plate, the method including: temporarily fixing an intermediate tank roof onto an inner tank roof and further temporarily fixing an outer tank roof onto the intermediate tank roof to form a connected roof body; installing an outer tank side plate having a predetermined height around the connected roof body; performing a sealing process between an outer peripheral edge of the outer tank roof and an inner face of the outer tank side plate to form a sealed space, and supplying air to the sealed space to air-raise the connected roof body; fixing the outer tank roof and the outer tank side plate; and installing an inner tank side plate and an intermediate tank side plate and releasing the temporary fixing of the connected roof body to fix the inner tank roof and the inner tank side plate and fix the intermediate tank roof and the intermediate tank side plate.

According to this construction method, the connected roof body in which the inner tank roof, the intermediate tank roof, and the outer tank roof are temporarily fixed to one another is formed before air-raising. Subsequently, after the outer tank side plate is formed around the connected roof body, the connected roof body is air-raised. What is directly air-raised is the outer tank roof, the inner tank roof and the intermediate tank roof are also integrally floated in an aspect of being held by the outer tank roof. That is, each roof of the triple shell is prepared by ground work, temporarily fixed, and integrated, and floated at once by one time of air-raising. Accordingly, most of the installation work of each roof of the triple shell can be executed by a low-place work, which contributes to shortening of the construction period. After the outer tank roof is fixed to the outer tank side plate to form the outer tank, the inner tank side plate and the intermediate tank side plate are installed. That is, since the installation work of the inner tank side plate and the intermediate tank side plate can be performed in a state of being covered with the outer tank, there is also an advantage of not being affected by the weather.

In the method for constructing a triple shell tank, it is desirable that an outer tank bottom plate constituting a bottom part of a region surrounded by the outer tank side plate be formed at least before the air-raising.

According to this construction method, by forming the outer tank bottom plate in advance, it is possible to facilitate formation of a sealed space necessary for air-raising.

In the method for constructing a triple shell tank, it is desirable that the connected roof body be formed by, placing a roof support on the outer tank bottom plate after forming the outer tank bottom plate, installing the inner tank roof on the roof support and placing a first temporary support on the inner tank roof, installing the intermediate tank roof on the first temporary support and placing a second temporary support on the intermediate tank roof, and installing the outer tank roof on the second temporary support.

According to this construction method, the connected roof body is formed by sequentially installing the intermediate tank roof and the outer tank roof on the inner tank roof of the innermost layer. Accordingly, the connected roof body can be formed with high work efficiency.

In the method for constructing a triple shell tank, it is desirable that the inner tank side plate and the intermediate tank side plate be assembled by stacking a plurality of circular steps formed by arranging a plurality of side plate pieces in a circular ring shape, and the circular step of the inner tank side plate and the circular step of the intermediate tank side plate be stacked in parallel.

According to this construction method, in installation of the inner tank side plate and the intermediate tank side plate, it is possible to achieve improvement of work efficiency such as sharing a scaffold, for example, and eventually contribute to shortening of the construction period.

In the method for constructing a triple shell tank, it is desirable that the inner tank side plate and the intermediate tank side plate be assembled by stacking a plurality of circular steps formed by arranging a plurality of side plate pieces in a circular ring shape, and the circular step of the inner tank side plate be assembled to an uppermost step prior to the intermediate tank side plate to fix the circular step of the uppermost step and an outer peripheral edge of the inner tank roof.

According to this construction method, since the roof and the side plate of the inner tank positioned inside relative to the intermediate tank are fixed first, workability can be improved as compared with a case where the roof and the side plate of the intermediate tank are fixed in advance.

In the method for constructing a triple shell tank, it is desirable that a first construction opening, which is a construction entrance, be opened in the outer tank side plate when the outer tank side plate is installed, a second construction opening be opened in the inner tank side plate when the inner tank side plate is installed, and a third construction opening be opened in the intermediate tank side plate when the intermediate tank side plate is installed, the second construction opening be sealed after completion of work inside the inner tank, and then the third construction opening be sealed after completion of work inside the intermediate tank, and subsequently, the first construction opening be sealed after completion of work inside the outer tank.

According to this construction method, the construction opening is timely opened in each of the outer tank side plate, the intermediate tank side plate, and the inner tank side plate to enable various types of construction to be smoothly advanced.

The invention claimed is:

1. A method for constructing a triple shell tank including an inner tank, an intermediate tank, and an outer tank each having a roof and a side plate, the method comprising:
- temporarily fixing an intermediate tank roof onto an inner tank roof and further temporarily fixing an outer tank roof onto the intermediate tank roof to form a connected roof body;
- installing an outer tank side plate having a predetermined height around the connected roof body;
- performing a sealing process between an outer peripheral edge of the outer tank roof and an inner face of the outer tank side plate to form a sealed space, and supplying air to the sealed space to air-raise the connected roof body;
- fixing the outer tank roof and the outer tank side plate; and
- installing an inner tank side plate and an intermediate tank side plate and releasing the temporary fixing of the connected roof body to fix the inner tank roof and the inner tank side plate and fix the intermediate tank roof and the intermediate tank side plate.

2. The method for constructing a triple shell tank according to claim 1, wherein an outer tank bottom plate constituting a bottom part of a region surrounded by the outer tank side plate is formed at least before the air-raising.

3. The method for constructing a triple shell tank according to claim 2, wherein
- the connected roof body is formed by
- placing a roof support on the outer tank bottom plate after forming the outer tank bottom plate,
- installing the inner tank roof on the roof support and placing a first temporary support on the inner tank roof,
- installing the intermediate tank roof on the first temporary support and placing a second temporary support on the intermediate tank roof, and
- installing the outer tank roof on the second temporary support.

4. The method for constructing a triple shell tank according to claim 1, wherein
- the inner tank side plate and the intermediate tank side plate are assembled by stacking a plurality of circular steps formed by arranging a plurality of side plate pieces in a circular ring shape, and
- the circular step of the inner tank side plate and the circular step of the intermediate tank side plate are stacked in parallel.

5. The method for constructing a triple shell tank according to claim 1, wherein
- the inner tank side plate and the intermediate tank side plate are assembled by stacking a plurality of circular steps formed by arranging a plurality of side plate pieces in a circular ring shape, and
- the circular step of the inner tank side plate is assembled to an uppermost step prior to the intermediate tank side plate to fix the circular step of the uppermost step and an outer peripheral edge of the inner tank roof.

6. The method for constructing a triple shell tank according to claim 1, wherein
- a first construction opening, which is a construction entrance, is opened in the outer tank side plate when the outer tank side plate is installed,
- a second construction opening is opened in the inner tank side plate when the inner tank side plate is installed, and a third construction opening is opened in the intermediate tank side plate when the intermediate tank side plate is installed,
- the second construction opening is sealed after completion of work inside the inner tank, and then the third construction opening is sealed after completion of work inside the intermediate tank, and
- subsequently, the first construction opening is sealed after completion of work inside the outer tank.

* * * * *